US012224151B2

(12) United States Patent
Qiu et al.

(10) Patent No.: US 12,224,151 B2
(45) Date of Patent: Feb. 11, 2025

(54) OPEN MICROFOCUS X-RAY SOURCE AND CONTROL METHOD THEREOF

(71) Applicant: Wuxi Unicomp Technology Co., Ltd., Wuxi (CN)

(72) Inventors: Xiaojun Qiu, Wuxi (CN); Wenwen Kong, Wuxi (CN); Wei Zhang, Wuxi (CN); Liucheng Wang, Wuxi (CN); Qi Hou, Wuxi (CN)

(73) Assignee: Wuxi Unicomp Technology Co., Ltd., Wuxi (CN)

( * ) Notice: Subject to any disclaimer, the term of this patent is extended or adjusted under 35 U.S.C. 154(b) by 613 days.

(21) Appl. No.: 17/558,628

(22) Filed: Dec. 22, 2021

(65) Prior Publication Data

US 2023/0069290 A1 Mar. 2, 2023

(30) Foreign Application Priority Data

Aug. 30, 2021 (CN) ......................... 202111006063.4

(51) Int. Cl.
*H01J 35/14* (2006.01)
*H05G 1/46* (2006.01)
(Continued)

(52) U.S. Cl.
CPC ............. *H01J 35/147* (2019.05); *H05G 1/52* (2013.01); *H01J 35/064* (2019.05); *H01J 35/112* (2019.05); *H05G 1/46* (2013.01)

(58) Field of Classification Search
CPC ................................. H01J 35/147; H05G 1/52
See application file for complete search history.

(56) References Cited

U.S. PATENT DOCUMENTS 4,333,011 A * 6/1982 Mester ..................... H05G 1/18 378/111
4,631,742 A * 12/1986 Oliver ................... H01J 35/305 378/118

(Continued)

OTHER PUBLICATIONS

JP 2003-004668 A and its English translation (Year: 2003).*
English translation of KR Patent Application No. 10-2021-0031625 (Year: 2021).*

*Primary Examiner* — Chih-Cheng Kao
(74) *Attorney, Agent, or Firm* — Bayramoglu Law Offices LLC

(57) ABSTRACT

An open microfocus X-ray source and a control method thereof are provided. The open microfocus X-ray source includes: an open X-ray tube, a high voltage power supply (HVPS) system, a vacuum system and a control system. The open X-ray tube includes a cathode system, a deflection system and a focusing system. The HVPS system is configured to provide an emission current $I_0$, an accelerating high voltage $U_0$ and a grid voltage $U_G$ for an electron beam. The vacuum system is configured to perform vacuumization. The control system is configured to control, according to a spot size of an electron beam for bombarding an anode target, the HVPS system to adjust the emission current $I_0$, the accelerating high voltage $U_0$, a deflection coil current $I_{XY}$ of the deflection system, and a focusing coil current $I_F$ of the focusing system, such that the spot size meets a preset requirement.

13 Claims, 4 Drawing Sheets

(51) Int. Cl.

| | |
|---|---|
| ***H05G 1/52*** | (2006.01) |
| *H01J 35/06* | (2006.01) |
| *H01J 35/08* | (2006.01) |

(56) References Cited

U.S. PATENT DOCUMENTS

| | | | | |
|---|---|---|---|---|
| 2009/0242744 | A1* | 10/2009 | Erler | H01J 35/147<br>250/252.1 |
| 2014/0140474 | A1* | 5/2014 | Caruso | G01N 23/02<br>378/53 |
| 2015/0035428 | A1* | 2/2015 | Sun | H01J 35/065<br>313/352 |
| 2022/0346212 | A1* | 10/2022 | Flachenecker | H01J 35/14 |
| 2022/0346214 | A1* | 10/2022 | Kim | H05G 1/265 |

* cited by examiner

OPEN MICROFOCUS X-RAY SOURCE AND CONTROL METHOD THEREOF

CROSS REFERENCE TO THE RELATED APPLICATIONS

This application is based upon and claims priority to Chinese Patent Application No. 202111006063.4, filed on Aug. 30, 2021, the entire contents of which are incorporated herein by reference.

TECHNICAL FIELD

The present invention relates to the field of microfocus technologies, and more particularly, to an open microfocus X-ray source and a control method thereof.

BACKGROUND

Microfocus X-ray sources are applied to the industrial inspection due to the high resolution. At present, X-rays are generally emitted from the microfocus X-ray sources by directly controlling the related systems by using fixed parameters, or X-rays are emitted by manually adjusting parameters of the open microfocus X-ray sources.

However, with the development of microfocus technologies, components in microfocus X-ray source systems are increased. The microfocus X-ray sources under the control of the fixed parameters cannot work at optimal parameters possibly due to external changes or the changes of the structures in the microfocus X-ray sources; and the microfocus X-ray sources with the parameters adjusted manually also cannot work at the optimal parameters possibly due to manual errors in operation, and thus the X-rays emitted according to the fixed parameters fails to meet the quality requirements.

SUMMARY

An objective of the present invention is to provide an open microfocus X-ray source. The open microfocus X-ray source can automatically adjust input parameters according to feedback parameter changes in order to work at optimal parameters, which induces the errors caused by the manual operation, improves the quality of the emitted X-rays and improves the stability in work.

The present invention further provides a control method of the open microfocus X-ray source.

The present invention adopts the following technical solutions:

A first embodiment of the present invention provides an open microfocus X-ray source, including: an open X-ray tube, where the open X-ray tube includes a cathode system, a deflection system and a focusing system, the cathode system is configured to emit an electron beam, the deflection system is configured to provide a deflection magnetic field for the electron beam, and the focusing system is configured to focus the electron beam to bombard an anode target to emit an X-ray; a high voltage power supply (HVPS) system, where the HVPS system is configured to provide an emission current $I_0$, an accelerating high voltage $U_0$ and a grid voltage $U_G$ for the electron beam; a vacuum system, where the vacuum system is configured to perform vacuumization; and a control system, where the control system is configured to control, according to a spot size of the electron beam for bombarding the anode target, the HVPS system to adjust the emission current $I_0$, the accelerating high voltage $U_0$, a deflection coil current $I_{XY}$ of the deflection system, and a focusing coil current $I_F$ of the focusing system, such that the spot size meets a preset requirement.

According to an embodiment of the present invention, the open microfocus X-ray source may further include: a cooling system, where the cooling system is configured to cool the focusing system and the anode target.

According to an embodiment of the present invention, the control system may further be configured to stop the HVPS system when a vacuum degree of the open microfocus X-ray source fails to meet a preset vacuum degree.

According to an embodiment of the present invention, the cathode system may include a filament; and the control system may further be configured to: turn on the open X-ray tube at a minimum accelerating high voltage when receiving a power-on instruction; gradually increase the accelerating high voltage $U_0$ to a maximum value at a preset compensation; calibrate the filament to optimize the emission current $I_0$; and center the electron beam according to the deflection coil current $I_{XY}$ of the deflection system and an anode current $I_T$ of the anode target.

According to an embodiment of the present invention, the deflection system may include a first deflection coil and a second deflection coil, the first deflection coil and the second deflection coil may be configured to generate a magnetic field respectively in an X direction and a Y direction on a plane perpendicular to a traveling direction of the electron beam, the X direction may be perpendicular to the Y direction, the deflection coil current $I_{XY}$ may include a first deflection current $I_X$ and a second deflection current $I_Y$, and the control system may center the electron beam according to the deflection coil current $I_{XY}$ of the deflection system and the anode current $I_T$ of the anode target by the following specific steps: providing the first deflection current $I_X$ for the first deflection coil, scanning the first deflection current $I_X$ from a negative value to a positive value to obtain the anode current $I_T$ flowing through the anode target until the anode current $I_T$ reaches a maximum value, and keeping the first deflection current $I_X$ unchanged; and providing the second deflection current $I_Y$ for the second deflection coil, and scanning the second deflection current $I_Y$ from a negative value to a positive value to obtain the anode current $I_T$ flowing through the anode target until the anode current $I_T$ reaches a maximum value.

According to an embodiment of the present invention, the control system may further be configured to: keep a power of the anode target constant, where the power of the anode target is equal to a product of the anode current $I_T$ of the anode target and the accelerating high voltage $U_0$.

According to an embodiment of the present invention, the control system may further be configured to: acquire the power of the anode target in real time, and activate an automatic defocusing function when the power of the anode target exceeds a preset power threshold.

According to an embodiment of the present invention, the control system may further be configured to: acquire initial parameters of the emission current $I_0$, the accelerating high voltage $U_0$, the deflection coil current $I_{XY}$ and the focusing coil current $I_F$; control the open microfocus X-ray source to work at the initial parameters; and adjust the accelerating high voltage $U_0$, the deflection coil current $I_{XY}$ and the focusing coil current $I_F$ with a machine learning algorithm to obtain deflection coil currents $I_{XY}$ and focusing coil currents $I_F$ corresponding to different accelerating high voltages $U_0$ when the spot size of the electron beam meets the preset requirement, and store the deflection coil currents $I_{XY}$ and the focusing coil currents $I_F$ in a table.

A second embodiment of the present invention provides a control method of the open microfocus X-ray source, including the following steps: controlling the vacuum system to perform vacuumization; controlling the HVPS system to provide the emission current $I_0$, the accelerating high voltage $U_0$ and the grid voltage $U_G$ for the electron beam, such that the cathode system emits the electron beam, the deflection system provides the deflection magnetic field for the electron beam, and the focusing system focuses the electron beam to bombard the anode target to emit the X-ray; and controlling, according to the spot size of the electron beam for bombarding the anode target, the HVPS system to adjust the emission current $I_0$, the accelerating high voltage $U_0$, the deflection coil current $I_{XY}$ of the deflection system, and the focusing coil current $I_F$ of the focusing system, such that the spot size meets the preset requirement.

The present invention has the following advantages:

(1) The present invention monitors vacuum in real time, and turns off the emission current when the vacuum becomes poor, which prolongs the service life of the cathode.

(2) The open microfocus X-ray source automatically adjusts the input parameters according to the feedback parameter change to work at optimal parameters, which induces the errors caused by the manual operation and improves the quality of the emitted X-rays.

(3) The present invention accumulates operation data and implements the machining learning to reduce the debugging time.

DETAILED DESCRIPTION OF THE EMBODIMENTS

The technical solutions in the embodiments of the present invention are clearly and completely described below with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The open microfocus X-ray source and the control method thereof provided in embodiments of the present invention will be described below in combination with the accompanying drawings.

Figure 1:
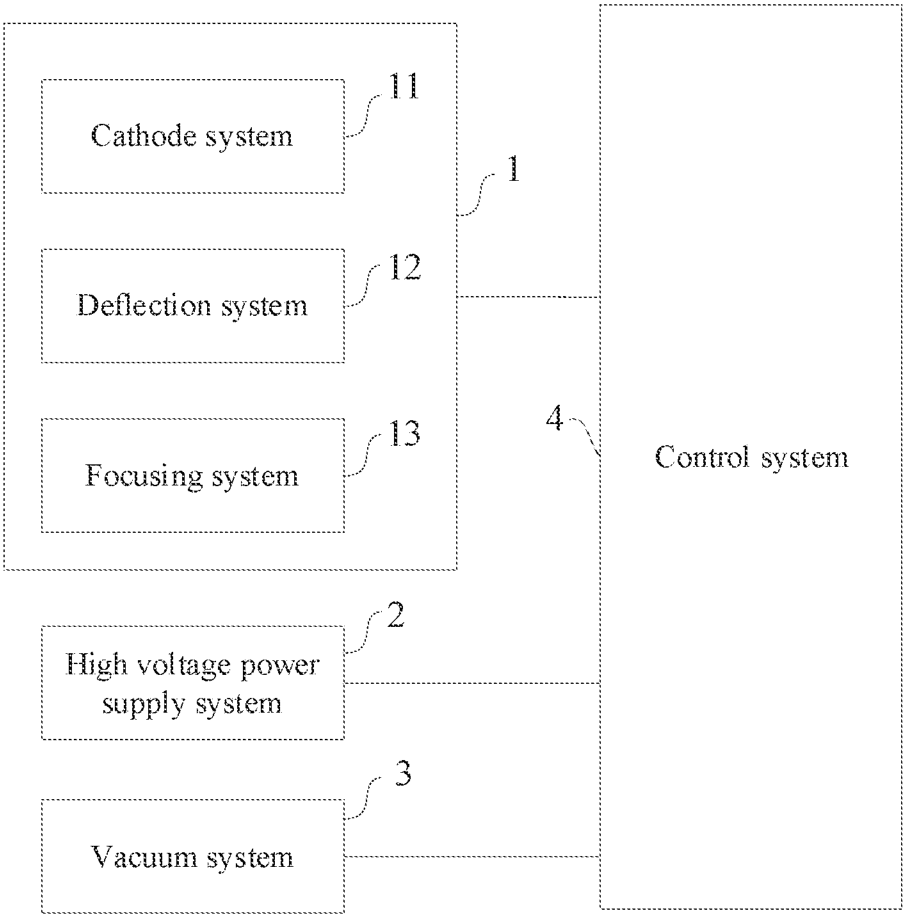
FIG. 1 illustrates a block diagram of an open microfocus X-ray source according to an embodiment of the present invention.

FIG. 1 illustrates a block diagram of an open microfocus X-ray source according to an embodiment of the present invention. As shown in FIG. 1, the open microfocus X-ray source includes: an open X-ray tube 1, an HVPS system 2, a vacuum system 3 and a control system 4, where the open X-ray tube 1 includes a cathode system 11, a deflection system 12, and a focusing system 13.

The cathode system 11 is configured to emit an electron beam, the deflection system 12 is configured to provide a deflection magnetic field for the electron beam, and the focusing system 13 is configured to focus the electron beam to bombard an anode target to emit an X-ray; the HVPS system 2 is configured to provide an emission current $I_0$, an accelerating high voltage $U_0$ and a grid voltage $U_G$ for the electron beam; the vacuum system 3 is configured to perform vacuumization; and the control system 4 is configured to control, according to a spot size of the electron beam for bombarding the anode target, the HVPS system 2 to adjust the emission current $I_0$, the accelerating high voltage $U_0$, a deflection coil current $I_{XY}$ of the deflection system, and a focusing coil current $I_F$ of the focusing system, such that the spot size meets a preset requirement.

Figure 2:
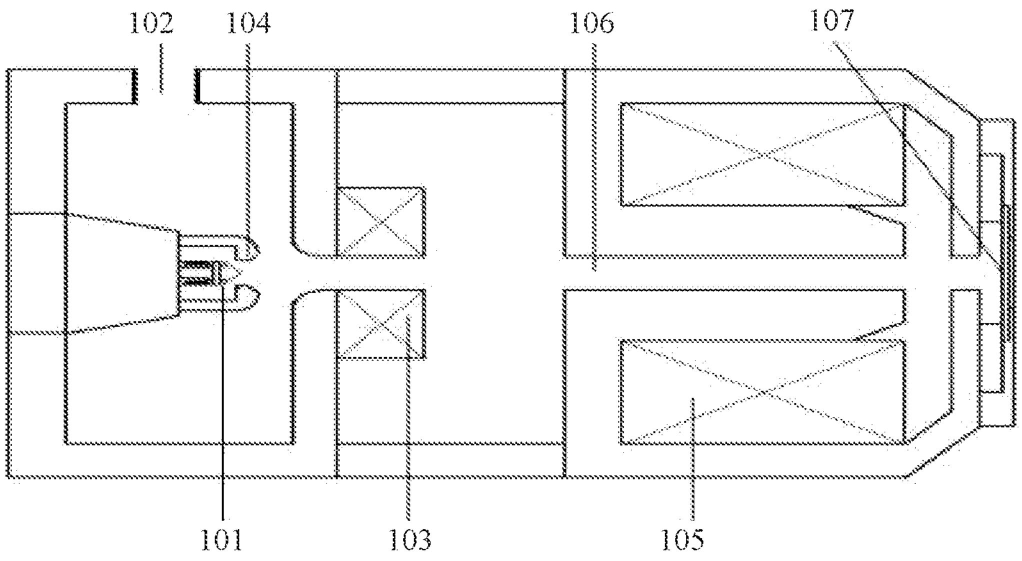
FIG. 2 illustrates a schematic structural diagram of an open microfocus X-ray source according to an embodiment of the present invention.

Specifically, the cathode system 11 includes a cathode, the deflection system 12 includes a deflection coil, and the focusing system 13 includes a focusing coil. Generally, as shown in FIG. 2, the structure of the open microfocus X-ray source includes a cathode 101, a vacuumizing channel 102, a deflection coil 103, a grid 104, a focusing coil 105, an electron beam channel 106 and an anode target (transmission target) 107. Generally, the cathode 101 is a high-performance cathode filament. The escape of the electrons is implemented by applying the emission current $I_0$ to the cathode filament; and by applying a huge potential difference (the accelerating high voltage $U_0$) between the cathode and the anode, the electrons escaping from the cathode are accelerated to travel toward the anode target 107. In face of numerous mechanical components, there are unavoidable tolerances during machining, though these components can be theoretically coaxial. Hence, without affecting the high machining accuracy, electron beams emitted from the cathode 101 are further centered by the deflection coil 103 to ensure that a maximum number of electrons reach the anode. Due to divergence of the electron beams emitted from the cathode 101, electrons having large divergence angles after passing through the grid 104 are screened, and electron beams having appropriate divergence angles are formed in the electron beam channel 106 to travel toward the anode. Divergent electron beams are focused under the action of the magnetic field when passing through the focusing coil 105, to bombard the anode target in a region having a diameter of 1 μm on the surface of the anode, thereby emitting X-rays.

The open X-ray tube 1 can be physically designed according to the tube voltage 160 kV and in combination with the photoelectronic simulation. With the tungsten filament, and the single magnetic lens for focusing the electron beams, the open X-ray tube cannot emit the X-rays until the spot size of the electron beam reaching the diamond-based tungsten target at last meets the preset requirement (which is 1 μm generally). In other words, the open microfocus X-ray source bombards the anode target with high-speed electrons to emit the X-rays. At 160 kV, it can form the crossover spots having the diameter of 25 μM. The crossover spots are formed into the "object" of the magnetic lens, while the beam spots on the anode target are formed into the focused "image".

The vacuum system 3 is mainly used to vacuumize the open X-ray tube and monitor a vacuum degree in the tube in real time. In order to protect the cathode filament and achieve the longer service life and better performance of the cathode filament, the control system 4 turns on the HVPS system for operation of the X-ray source only if the vacuum degree is higher than 5E-4 Pa.

The emission current $I_0$, the accelerating high voltage $U_0$ and the grid voltage $U_G$ are provided by the HVPS system 2. The spot size on the anode target 107 is affected by the emission current $I_0$, the accelerating high voltage $U_0$, the deflection coil current $I_{XY}$ of the deflection system, and the focusing coil current $I_F$ of the focusing system. The control system 4 adjusts the emission current $I_0$, the accelerating high voltage $U_0$, the deflection coil current $I_{XY}$ of the deflection system, and the focusing coil current $I_F$ of the focusing system in real time according to the spot size, so as to keep the spot size at about 1 μm and ensure the quality of the emitted X-rays. Therefore, the open microfocus X-ray source can automatically adjust the input parameters according to the feedback parameter change to work at the optimal parameters, which induces the errors caused by the manual operation and improves the quality of the emitted X-rays.

Figure 3:
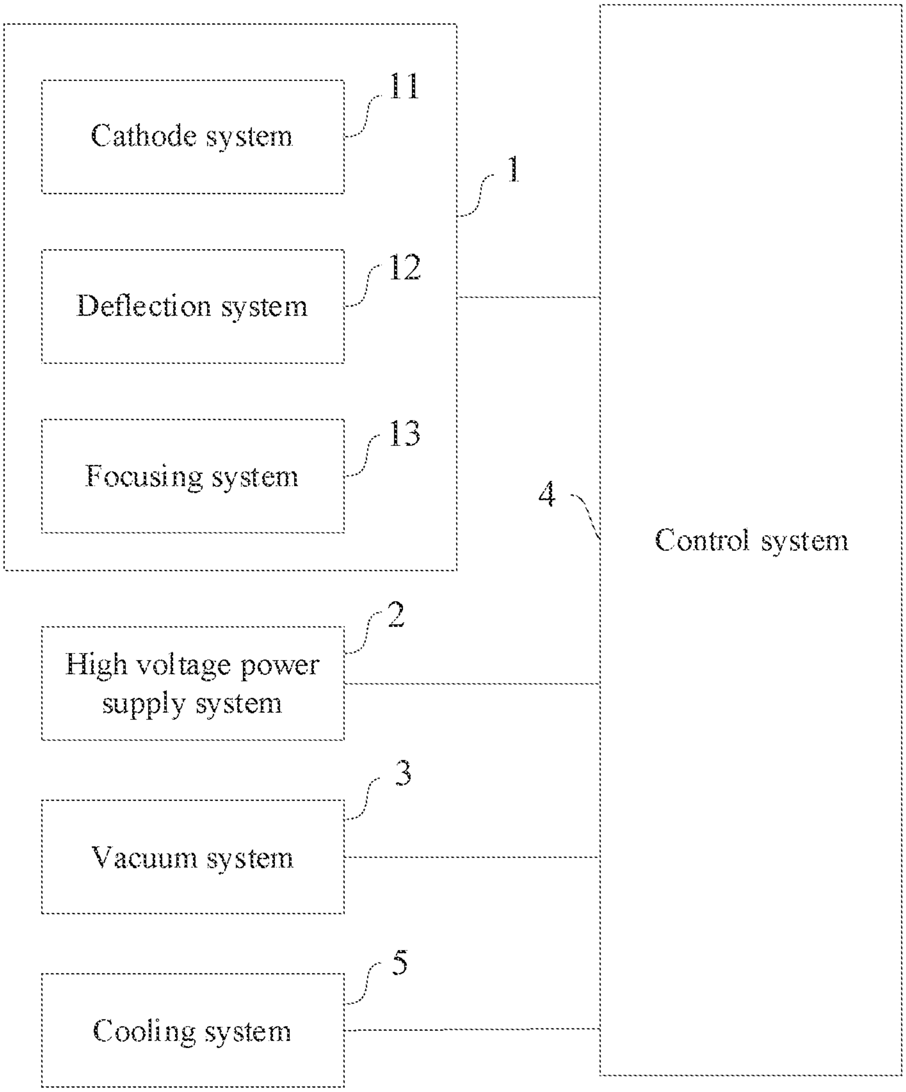
FIG. 3 illustrates a block diagram of an open microfocus X-ray source according to another embodiment of the present invention.

According to an embodiment of the present invention, as shown in FIG. 3, the open microfocus X-ray source further includes: a cooling system 5, where the cooling system 5 is configured to cool the focusing system 13 and the anode target 107.

Specifically, the cooling system 5 can cool the focusing system 13 and the anode target 107 for the ease of heat dissipation. In this way, the whole open microfocus X-ray source is more stable, and the damage of the open microfocus X-ray source caused by the high temperature is prevented.

According to an embodiment of the present invention, the control system 4 is further configured to stop the HVPS system when a vacuum degree of the open microfocus X-ray source fails to meet a preset vacuum degree.

Specifically, the control system 4 can communicate with other systems through an Ethernet. The control system is used to turn on the cooling system 5 and the vacuum system 3 and monitor the vacuum degree in real time. It keeps other operations locked if a desired vacuum degree is not achieved, and turns on the HVPS system only if the vacuum degree is higher than 5E-4 Pa.

It may be appreciated that the accelerating high voltage $U_0$ affects the photon energy of the X-rays, specifically, the higher the accelerating high voltage $U_0$, the higher the energy of the X-rays, and the stronger the penetrability of the rays. However, when the emission current $I_0$ of the open X-ray tube 1 is big enough and is kept unchanged, the increase of the accelerating high voltage $U_0$ will reduce the contrast in the image; and when the accelerating high voltage $U_0$ is a constant, the increase of the emission current $I_0$ will improve the signal-to-noise ratio (SNR) and the image contrast. It is to be noted that the emission current $I_0$ cannot be increased arbitrarily because of the thermal load capacity of the anode material; and the smaller the focal spot, the smaller the allowable emission current $I_0$.

In practice, the focusing coil in the focusing system can generate a strong bell-like magnetic field through a magnetic yoke in a small local area; and with the focal length determined by the structure of the focusing coil 105 and the magnetic yoke thereof, and usually the focus located on the surface of the anode target, the electron beam is focused by the magnetic field, thus forming the micro-level focal spot.

Upon the determination of the structure of the focusing coil 105 in the open microfocus X-ray source, the magnetic field distribution becomes the unique parameter to affect the focusing performance. As kinetic energy of the electrons increases, the traveling time of the electrons in the magnetic field is shorter and the focusing capacity of the focusing coil 105 for the electrons is reduced. In this case, there is a need to increase the magnetic field to focus the electrons, namely increase the excitation current $I_F$ of the focusing coil.

According to an embodiment of the present invention, the control system 4 is further configured to: acquire initial parameters of the emission current $I_0$, the accelerating high voltage $U_0$, the deflection coil current $I_{XY}$ and the focusing coil current $I_F$; control the open microfocus X-ray source to work at the initial parameters; and adjust the accelerating high voltage $U_0$, the deflection coil current $I_{XY}$ and the focusing coil current $I_F$ with a machine learning algorithm to obtain deflection coil currents $I_{XY}$ and focusing coil currents $I_F$ corresponding to different accelerating high voltages $U_0$ when the spot size of the electron beam meets the preset requirement, and store the deflection coil currents $I_{XY}$ and the focusing coil currents $I_F$ in a table.

Specifically, the open microfocus X-ray source needs to be debugged before powered on. During debugging, in combination with photoelectronic computer simulation results, the X-ray source is debugged in term of focusing and deflection within the whole high voltage range; and focusing parameters and deflection parameters of the X-ray source are determined according to a feedback to the target currents, namely each accelerating high voltage corresponds to one group of focusing and deflection parameters, for example, when the accelerating high voltage $U_0$ is $U_{01}$, the focusing coil current $I_F$ is $I_{F1}$, and the deflection coil current $I_{XY}$ is $I_{X1}$ and $I_{Y1}$. The parameter table provides reference data for applications. When the accelerating high voltage is set, the control system 4 automatically invokes the parameter table and keeps the focusing and deflection parameters synchronous, such that the open microfocus X-ray source works at optimal parameters.

More specifically, before the open microfocus X-ray source is powered on, the control system 4 can calculate the initial parameters of the emission current $I_0$, the accelerating high voltage $U_0$, the deflection coil current $I_{XY}$ and the focusing coil current $I_F$ according to relevant photoelectronic theories, and control the open microfocus X-ray source to work at the initial parameters; and after the control system 4 receives a feedback parameter, the control system 4 analyzes data with a predetermined photoelectronic learning algorithm and adjusts the emission current $I_0$, the accelerating high voltage $U_0$, the deflection coil current $I_{XY}$ and the focusing coil current $I_F$ to further optimize the parameter. During the whole debugging and testing process, a number of data can be generated, including all input parameters and output parameters. All data are stored to the database of the control system 4 to form datasets. With these data, both the stability of the system and the performance of the X-ray tube can be analyzed. All preferable data subjected to the test and meeting the requirements will be formed into datasets for the learning algorithm and provided for users, so as to reduce the debugging time. In application scenarios of the X-ray source, various parameters may be tuned and relevant data will also be stored to the database; and the control system 4 will perform learning and analysis on these data and automatically generate preferable parameters, all of which implement intelligent control on the X-ray source system.

According to an embodiment of the present invention, the cathode 11 system includes a filament; and the control system 4 is further configured to: turn on the open X-ray tube at a minimum accelerating high voltage when receiving a power-on instruction; gradually increase the accelerating high voltage $U_0$ to a maximum value at a preset compensation; calibrate the filament to optimize the emission current $I_0$; and center the electron beam according to the deflection coil current $I_{XY}$ of the deflection system and an anode current $I_T$ of the anode target.

Specifically, since all physical structures of the open X-ray tube 1 are ideally coaxial with the principle axis in optoelectronic simulation, and there are unavoidable tolerances in the machining of the components, a training process is performed first after the open microfocus X-ray source is powered on, specifically: the open X-ray tube is turned on at the minimum accelerating high voltage; the accelerating high voltage $U_0$ is gradually increased to the maximum value at the preset compensation; and the electron beam is centered once automatically. Therefore, deviations caused by external factors are reduced, and the quality of the X-rays emitted from the open microfocus X-ray source is improved.

The filament calibration is the prior art and will not be repeated herein.

In an embodiment of the present invention, the deflection system 12 includes a first deflection coil and a second deflection coil, the first deflection coil and the second deflection coil are configured to generate a magnetic field respectively in an X direction and a Y direction on a plane perpendicular to a traveling direction (Z direction) of the electron beam, the X direction is perpendicular to the Y direction, the deflection coil current $I_{XY}$ includes a first deflection current $I_X$ and a second deflection current $I_Y$, the first deflection coil and the second deflection coil may generate the magnetic field in the X/Y direction on the plane perpendicular to the travelling direction (Z) of the electron beam, and under the action of a Lorentz force in the magnetic field, the electrons deflect their traveling direction while keeping the same kinetic energy, to compensate physical deviations in the traveling direction of the electron beam because the components of the open microfocus X-ray source are not coaxial to the principal axis.

The control system 4 centers the electron beam according to the deflection coil current $I_{XY}$ of the deflection system and the anode current $I_T$ of the anode target by the following specific steps: The first deflection current $I_X$ is provided for the first deflection coil, the first deflection current $I_X$ from a negative value to a positive value is scanned to obtain the anode current $I_T$ flowing through the anode target until the anode current $I_T$ reaches a maximum value, and the first deflection current $I_X$ is kept unchanged; and the second deflection current $I_Y$ is provided for the second deflection coil, and the second deflection current $I_Y$ from a negative value to a positive value is scanned to obtain the anode current $I_T$ flowing through the anode target until the anode current $I_T$ reaches a maximum value. Therefore, the electron beam is modulated, and the maximum number of electrons can reach the anode target through the electron beam channel.

In the embodiment of the present invention, the control system 4 is further configured to: keep a power of the anode target constant, where the power of the anode target is equal to a product of the anode current $I_T$ of the anode target and the accelerating high voltage $U_0$.

In other words, when the open microfocus X-ray source works, the control system controls the open microfocus X-ray source to work at a fixed power mode and keeps the power of the anode target constant. In the fixed power mode, the control system 4 automatically controls the anode current $I_T$ according to the accelerating high voltage $U_0$ to keep the power of the anode target constant.

In the embodiment of the present invention, the control system 4 is further configured to: acquire the power of the anode target in real time, and activate an automatic defocusing function when the power of the anode target exceeds a preset power threshold.

Specifically, the control system 4 monitors the accelerating high voltage $U_0$ and the anode current $I_T$ of the anode target in real time. When the power of the anode target exceeds the preset power threshold, the target material may be damaged because the thermal power from bombardment of the high-speed electron beam to the anode target cannot be fully dissipated. In this case, the control system 4 activates the automatic defocusing function quickly so as to increase the focal spot automatically. When the power of the anode target is lower than the preset power threshold, the control system 4 turns off the defocusing function.

To sum up, the open microfocus X-ray source in the embodiment of the present invention prolongs the service life of the cathode by monitoring the vacuum in real time and turning off the emission current when the vacuum becomes poor; implements intelligent control and can automatically adjust the input parameters according to the feedback parameter change to work at the optimal parameters, which induces the errors caused by the manual operation and improves the quality of the emitted X-rays; and accumulates operation data and implements machine learning to reduce the debugging time.

Figure 4:
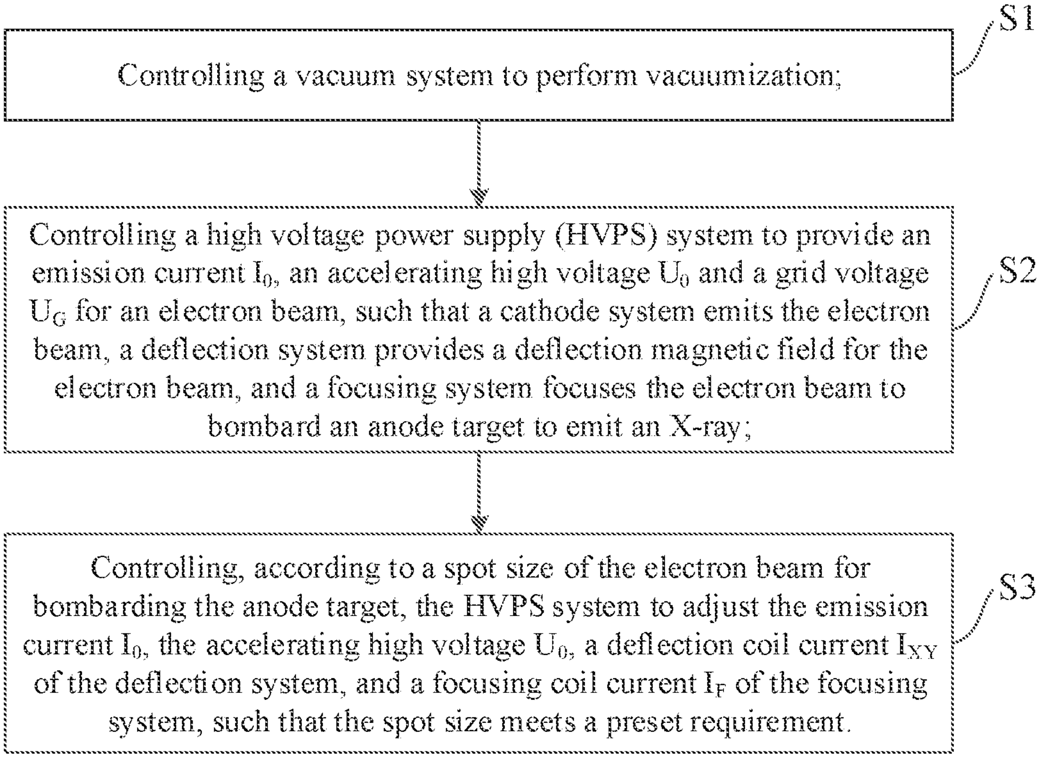
FIG. 4 illustrates a flow chart of a control method of an open microfocus X-ray source according to another embodiment of the present invention.

Based on the above open microfocus X-ray source, the present invention further provides a control method of the open microfocus X-ray source. As shown in FIG. 4, the method includes the following steps:

S1: Control the vacuum system to perform vacuumization.

S2: Control the HVPS system to provide the emission current $I_0$, the accelerating high voltage $U_0$ and the grid voltage $U_G$ for the electron beam, such that the cathode system emits the electron beam, the deflection system provides the deflection magnetic field for the electron beam, and the focusing system focuses the electron beam to bombard the anode target to emit the X-ray.

S3: Control, according to the spot size of the electron beam for bombarding the anode target, the HVPS system to adjust the emission current $I_0$, the accelerating high voltage $U_0$, the deflection coil current $I_{XY}$ of the deflection system, and the focusing coil current $I_F$ of the focusing system, such that the spot size meets the preset requirement.

According to the control method of the open microfocus X-ray source in the embodiment of the present invention, the open microfocus X-ray source can automatically adjust the input parameters according to the feedback parameter change to work at the optimal parameters, which induces the errors caused by the manual operation and improves the quality of the emitted X-rays.

In the description of the present invention, terms such as "first" and "second" are used merely for a descriptive purpose, and should not be construed as indicating or implying relative importance, or implicitly indicating the number of indicated technical features. Thus, features defined with "first" and "second" may explicitly or implicitly include one or more of the features. The term "a plurality of" means two or more, unless otherwise specifically defined.

In the present invention, unless otherwise clearly specified, the terms "installation", "interconnection", "connection" and "fixation" etc. are intended to be understood in a broad sense. For example, it may be a fixed connection, removable connection or integral connection; may be a mechanical connection or electrical connection; may be a direct connection or indirect connection using a medium; and may be a communication or interaction between two elements. Those of ordinary skill in the art may understand specific meanings of the above terms in the present invention based on a specific situation.

In the present invention, unless otherwise explicitly specified, when it is described that a first feature is "above" or "below" a second feature, it indicates that the first and second features are in direct contact or the first and second features are in indirect contact through an intermediate feature. In addition, when it is described that the first feature is "over", "above" and "on" the second feature, it indicates that the first feature is directly or obliquely above the second feature, or simply indicates that an altitude of the first feature is higher than that of the second feature. When it is described that a first feature is "under", "below" or "beneath" a second feature, it indicates that the first feature is directly or obliquely under the second feature or simply indicates that the first feature is lower than the second feature.

In this specification, the description of "one embodiment", "some embodiments", "an example", "a specific example" and "some examples" means that a specific feature, structure, material or characteristic described in combination with the embodiment(s) or example(s) is included in at least one embodiment or example of the present invention. In this specification, the schematic representation of the above terms is not necessarily directed to the same embodiment or example. Moreover, the specific features, structures, materials, or characteristics described may be combined in a suitable manner in any one or more embodiments or examples. In addition, a person skilled in the art may combine different embodiments or examples described in this specification and characteristics of the different embodiments or examples without mutual contradiction.

Although the embodiments of the present invention have been illustrated and described, it should be understood that those of ordinary skill in the art may make various changes, modifications, replacements, and variations to the above embodiments without departing from the principle and spirit of the present invention, and the scope of the present invention is limited by the appended claims and their legal equivalents.

What is claimed:

1. An open microfocus X-ray source, comprising:

an open X-ray tube, wherein the open X-ray tube comprises a cathode system, a deflection system and a focusing system, the cathode system is configured to emit an electron beam, the deflection system is configured to provide a deflection magnetic field for the electron beam, and the focusing system is configured to focus the electron beam to bombard an anode target to emit an X-ray;

a high voltage power supply (HVPS) system, wherein the HVPS system is configured to provide an emission current $I_0$, an accelerating high voltage $U_0$ and a grid voltage $U_G$ for the electron beam;

a vacuum system, wherein the vacuum system is configured to perform vacuumization; and a control system, wherein the control system is configured to control, according to a spot size of the electron beam for bombarding the anode target, the HVPS system to adjust the emission current $I_0$, the accelerating high voltage $U_0$, a deflection coil current $I_{XY}$ of the deflection system, and a focusing coil current $I_F$ of the focusing system, wherein the spot size meets a preset requirement, wherein the cathode system comprises a filament; and the control system is further configured to:

turn on the open X-ray tube at a minimum accelerating high voltage when receiving a power-on instruction:

gradually increase the accelerating high voltage Ue to a first maximum value at a preset compensation:

calibrate the filament; and center the electron beam according to the deflection coil current $I_{XY}$ of the deflection system and an anode current $I_T$ of the anode target, wherein the deflection system comprises a first deflection coil and a second deflection coil, wherein the first deflection coil and the second deflection coil are configured to generate a magnetic field respectively in an X direction and a Y direction on a plane perpendicular to a traveling direction of the electron beam, the X direction is perpendicular to the Y direction, and the deflection coil current $I_{XY}$ comprises a first deflection current $I_X$ and a second deflection current $I_Y$; and the control system centers the electron beam according to the deflection coil current $I_{XY}$ of the deflection system and the anode current $I_T$ of the anode target by the following specific steps:

providing the first deflection current $I_X$ for the first deflection coil, scanning the first deflection current $I_X$ from a negative value to a positive value to obtain the anode current $I_T$ flowing through the anode target until the anode current $I_T$ reaches a second maximum value, and keeping the first deflection current $I_X$ unchanged; and providing the second deflection current $I_Y$ for the second deflection coil, and scanning the second deflection current $I_Y$ from a negative value to a positive value to obtain the anode current $I_T$ flowing through the anode target until the anode current $I_T$ reaches a third maximum value.

2. The open microfocus X-ray source according to claim 1, further comprising: a cooling system, wherein the cooling system is configured to cool the focusing system and the anode target.

3. The open microfocus X-ray source according to claim 1, wherein the control system is further configured to stop the HVPS system when a vacuum degree of the open microfocus X-ray source fails to meet a preset vacuum degree.

4. The open microfocus X-ray source according to claim 1, wherein the control system is further configured to: keep a power of the anode target constant, wherein the power of the anode target is equal to a product of the anode current $I_T$ of the anode target and the accelerating high voltage $U_0$.

5. The open microfocus X-ray source according to claim 4, wherein the control system is further configured to: acquire the power of the anode target in real time, and activate an automatic defocusing function when the power of the anode target exceeds a preset power threshold.

6. An open microfocus X-ray source, comprising:

an open X-ray tube, wherein the open X-ray tube comprises a cathode system, a deflection system and a focusing system, the cathode system is configured to emit an electron beam, the deflection system is configured to provide a deflection magnetic field for the electron beam, and the focusing system is configured to focus the electron beam to bombard an anode target to emit an X-ray;

a high voltage power supply (HVPS) system, wherein the HVPS system is configured to provide an emission current $I_0$, an accelerating high voltage $U_0$ and a grid voltage $U_G$ for the electron beam;

a vacuum system, wherein the vacuum system is configured to perform vacuumization; and a control system, wherein the control system is configured to control, according to a spot size of the electron beam for bombarding the anode target, the HVPS system to adjust the emission current $I_0$, the accelerating high voltage $U_0$, a deflection coil current $I_{XY}$ of the deflection system, and a focusing coil current $I_F$ of the focusing system, wherein the spot size meets a preset requirement, wherein the control system is further configured to:

acquire initial parameters of the emission current $I_0$, the accelerating high voltage $U_0$, the deflection coil current $I_{XY}$ and the focusing coil current $I_F$;

control the open microfocus X-ray source to work at the initial parameters; and adjust the accelerating high voltage $U_0$, the deflection coil current $I_{XY}$ and the focusing coil current $I_F$ with a machine learning algorithm to obtain deflection coil currents $I_{XY}$ and focusing coil currents $I_F$ corresponding to different accelerating high voltages Ue when the spot size of the electron beam meets the preset requirement, and store the deflection coil currents $I_{XY}$ and the focusing coil currents $I_F$ in a table.

7. A control method of an open microfocus X-ray source comprising an open X-ray tube, wherein the open X-ray tube comprises a cathode system, a deflection system and a focusing system, the cathode system is configured to emit an electron beam, the deflection system is configured to provide a deflection magnetic field for the electron beam, and the focusing system is configured to focus the electron beam to bombard an anode target to emit an X-ray: a high voltage power supply (HVPS) system, wherein the HVPS system is configured to provide an emission current $I_0$, an accelerating high voltage $U_0$ and a grid voltage $U_G$ for the electron beam: a vacuum system, wherein the vacuum system is configured to perform vacuumization; and a control system, wherein the control system is configured to control, according to a spot size of the electron beam for bombarding the anode target, the HVPS system to adjust the emission current $I_0$, the accelerating high voltage $U_0$, a deflection coil current $I_{XY}$ of the deflection system, and a focusing coil current $I_F$ of the focusing system, wherein the spot size meets a preset requirement, the method comprising:

controlling the vacuum system to perform vacuumization;

controlling the HVPS system to provide the emission current $I_0$, the accelerating high voltage $U_0$ and the grid voltage $U_G$ for the electron beam, wherein the cathode system emits the electron beam, the deflection system provides the deflection magnetic field for the electron beam, and the focusing system focuses the electron beam to bombard the anode target to emit the X-ray; and controlling, according to the spot size of the electron beam for bombarding the anode target, the HVPS system to adjust the emission current $I_0$, the accelerating high voltage $U_0$, the deflection coil current $I_{XY}$ of the deflection system, and the focusing coil current $I_F$ of the focusing system, wherein the spot size meets the preset requirement, wherein the control system is further configured to:

acquire initial parameters of the emission current $I_0$, the accelerating high voltage $U_0$, the deflection coil current $I_{XY}$ and the focusing coil current $I_F$;

control the open microfocus X-ray source to work at the initial parameters; and adjust the accelerating high voltage $U_0$, the deflection coil current $I_{XY}$ and the focusing coil current $I_F$ with a machine learning algorithm to obtain deflection coil currents $I_{XY}$ and focusing coil currents $I_F$ corresponding to different accelerating high voltages $U_0$ when the spot size of the electron beam meets the preset requirement, and store the deflection coil currents $I_{XY}$ and the focusing coil currents $I_F$ in a table.

8. The control method according to claim 7, wherein the open microfocus X-ray source further comprises a cooling system, wherein the cooling system is configured to cool the focusing system and the anode target.

9. The control method according to claim 7, wherein the control system is further configured to stop the HVPS system when a vacuum degree of the open microfocus X-ray source fails to meet a preset vacuum degree.

10. The control method according to claim 7, wherein the cathode system comprises a filament; and the control system is further configured to:

turn on the open X-ray tube at a minimum accelerating high voltage when receiving a power-on instruction;

gradually increase the accelerating high voltage $U_0$ to a first maximum value at a preset compensation;

calibrate the filament; and center the electron beam according to the deflection coil current $I_{XY}$ of the deflection system and an anode current $I_T$ of the anode target.

11. The control method according to claim 10, wherein the deflection system comprises a first deflection coil and a second deflection coil, wherein the first deflection coil and the second deflection coil are configured to generate a magnetic field respectively in an X direction and a Y direction on a plane perpendicular to a traveling direction of the electron beam, the X direction is perpendicular to the Y direction, and the deflection coil current $I_{XY}$ comprises a first deflection current $I_X$ and a second deflection current $I_Y$; and the control system centers the electron beam according to the deflection coil current $I_{XY}$ of the deflection system and the anode current $I_T$ of the anode target by the following specific steps:

providing the first deflection current $I_X$ for the first deflection coil, scanning the first deflection current $I_X$ from a negative value to a positive value to obtain the anode current $I_T$ flowing through the anode target until the anode current $I_T$ reaches a second maximum value, and keeping the first deflection current $I_X$ unchanged; and providing the second deflection current $I_Y$ for the second deflection coil, and scanning the second deflection current $I_Y$ from a negative value to a positive value to obtain the anode current $I_T$ flowing through the anode target until the anode current $I_T$ reaches the second maximum value.

12. The control method according to claim 10, wherein the control system is further configured to: keep a power of the anode target constant, wherein the power of the anode target is equal to a product of the anode current $I_T$ of the anode target and the accelerating high voltage $U_0$.

13. The control method according to claim 12, wherein the control system is further configured to: acquire the power of the anode target in real time, and activate an automatic defocusing function when the power of the anode target exceeds a preset power threshold.

* * * * *